United States Patent [19]
Vallance

[11] Patent Number: 5,351,929
[45] Date of Patent: Oct. 4, 1994

[54] MOUNTING DEVICE

[75] Inventor: William E. T. Vallance, Marlow, England

[73] Assignee: Titus International Limited, Buckinghamshire, United Kingdom

[21] Appl. No.: 109,956

[22] Filed: Aug. 23, 1993

[30] Foreign Application Priority Data

Aug. 25, 1992 [GB] United Kingdom ............. 9218033.0

[51] Int. Cl.⁵ ............................................. F16M 13/00
[52] U.S. Cl. .................. 248/544; 248/225.1; 312/245
[58] Field of Search ............... 248/225.1, 287, 544; 312/245; 211/87, 90

[56] References Cited

U.S. PATENT DOCUMENTS

| | | | |
|---|---|---|---|
| 3,946,979 | 3/1976 | Ehlebracht | 312/245 X |
| 4,576,355 | 3/1986 | Graf | 248/544 |
| 4,936,534 | 6/1990 | Cattaneo | 248/225.1 |

FOREIGN PATENT DOCUMENTS

| | | | |
|---|---|---|---|
| 2920390 | 11/1980 | European Pat. Off. | 312/245 |
| 33179 | 8/1981 | European Pat. Off. | 312/245 |
| 2615425 | 10/1977 | Fed. Rep. of Germany | 312/245 |
| 2641648 | 3/1978 | Fed. Rep. of Germany | 312/245 |
| 2245820 | 1/1992 | United Kingdom | 312/245 |

OTHER PUBLICATIONS

Document 1, Schrankaufhanger, Catalogue Sheet.
Document 2, Dresselhaus, Catalogue Sheet.
Document 3, Dresselhaus, Catalogue Sheet
Document 4, Schrankaufhanger, Catalogue Sheet.

Primary Examiner—J. Franklin Foss
Attorney, Agent, or Firm—Lowe, Price, LeBlanc & Becker

[57] ABSTRACT

A device 10 for mounting a panel 102 to a bracket 106 on a wall 108 with the panel vertical and at right angles to the wall. The device comprises a housing 12 adapted to be secured with a reference surface thereof against a major surface of the panel and houses a hanging member 14 which lies substantially parallel to said reference surface. An end of the hanging member 14 extends beyond the housing and is adapted for engagement with the bracket. The device further comprises means for adjusting the position of the hanging member relative to the housing so that said end is moveable in a plane substantially parallel to the reference surface. The adjusting means comprises two adjusting devices 50, 70 for moving said end in respective different directions and each adjusting device includes a single component which contacts the hanging member so as to be able to move said member, and which also is in high-interference contact with the housing to resist an inadvertent change of its adjusted position.

22 Claims, 5 Drawing Sheets

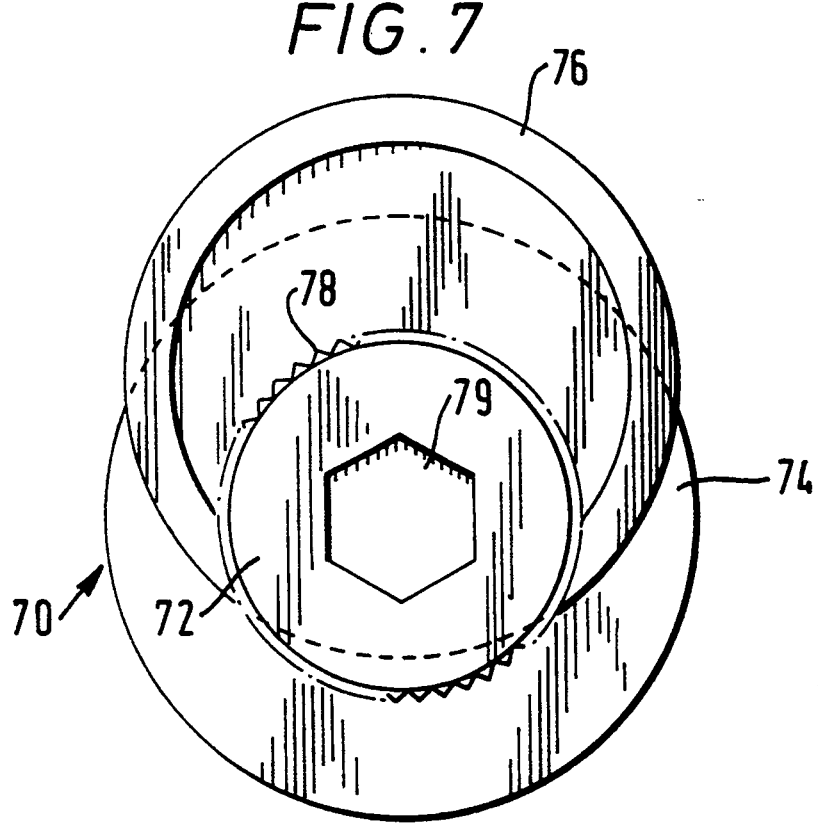
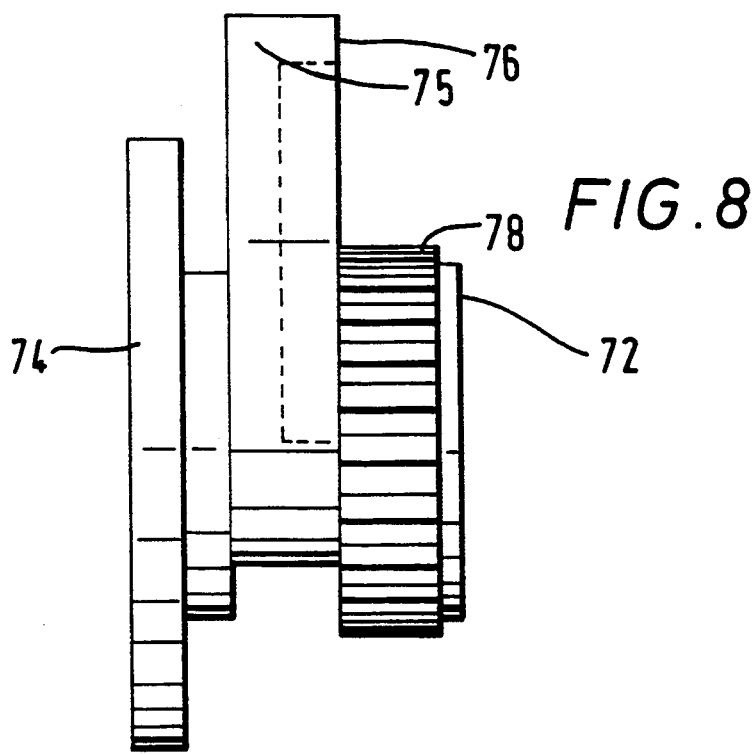

MOUNTING DEVICE

The invention relates to devices for mounting furniture to a wall.

In particular, it relates to the types of device used to mount cupboards, cabinets and the like to a fixture secured to a wall wherein the position of the cupboard relative to the fixture may be adjusted.

Typically, in use for mounting a cupboard or the like, these devices are used in pairs, one being provided at each of the rear upper corners of the cupboard. The fixture may be in the form of a rail having a length corresponding substantially to the width of the cupboard or a pair of relatively shorter brackets which would be secured to the wall in a spaced apart relationship corresponding to the cupboard width.

A known device of this type is shown in FIGS. 1a and 1b and comprises a hollow plastics housing having a substantially U-shaped member protruding therefrom. The U-shaped member is adapted to engage a metal fixture secured to a wall. A first screw jack acting in the direction of the longitudinal axis of the U-shaped member and a second screw jack acting in a direction perpendicular to that axis are provided for adjusting the position of the housing relative to the fixture. The nut of the first screw jack is securely fixed in the open end of the U-shaped member and the head portion of the corresponding screw is axially retained between a wall of the housing and a pair of housing ribs, the arrangement being such that the U-shaped member may be axially driven by rotating the screw. The screw of the second screw jack is free to rotate but its axial movement is limited in one direction by the housing and in the other by virtue of engagement with the nut abutting the U-shaped member. The corresponding nut is constrained to slide between a pair of housing ribs and a wall of the housing in response to the rotation of the screw.

In use for mounting a cupboard, the housing is securely fixed to a major surface of a side panel of the cupboard so as to be positioned in an upper corner adjacent the rear thereof. When so positioned, the U-shaped member protruding from the housing is directed to the rear of the cupboard. If the cupboard is provided with a back or rear panel, an aperture must be provided therein so that the U-shaped member may protrude from the cupboard for engaging the wall fixture. The cupboard is lifted to the fixture so that the U-shaped member of the device may engage the fixture so that the cupboard hangs on the wall. The weight of the cupboard causes the U-shaped member to bear against the nut of the second screw jack and by rotating the screw thereof, the vertical position of the cupboard may be adjusted relative to the fixture. Once this adjustment is completed, the rear of the cupboard may be brought to bear firmly against the wall by rotating the screw of the first screw jack which draws the housing towards the wall fixture.

It will be appreciated that where a cupboard is mounted using pair of these devices, the cupboard may be levelled by operation of the second screw jack in a simple manner. Equally, where the cupboard is being mounted in a horizontal line with similar such cabinets, it is easy to ensure that all the cabinets/cupboards are level with each other.

A disadvantage of the known device is that it comprises several components and is relatively complex to assemble. Further the configuration is such that the width of the housing, that is the amount by which it extends perpendicularly of the panel surface to which it is secured, is relatively large. This width is at least in part determined by the size of the nuts used in the screw jacks. Obviously the screw must be of sufficient size (diameter) to be able to withstand the loads imposed upon it, and the nut must be correspondingly larger. Thus, the scope for reducing the width of the known device is limited. Further, in use, the proximity of the head portions of the screws to a major surface of a panel to which the housing is fixed, can make it difficult to manipulate a screw driver for operating the screw jacks.

The present invention aims to, at least in part, overcome some of the disadvantages of the prior art outlined above. Accordingly the invention provides a mounting device for mounting a panel to a bracket on a wall with the panel vertical and at right angles to the wall, comprising a base member adapted to be secured with a reference surface thereof against a major surface of the panel and carrying a hanging member which lies substantially parallel to said reference surface and one end of which extends beyond the base member and is adapted for engagement with said bracket, and means for adjusting the position of the hanging member relative to the base member so that said end is moveable in a plane substantially parallel to said reference surface, characterised in that the adjusting means comprises two adjusting devices for moving said end in respective different directions and in that each adjusting device includes a single component which contacts the hanging member so as to be able to move said member, and which also is in high-interference contact with the base member to resist an inadvertent change of its adjusted position.

The invention also provides a mounting device for mounting a panel to a bracket on a wall with the panel vertical and at right angles to the wall, comprising a base member adapted to be secured with a reference surface thereof against a major surface of the panel and carrying a hanging member which lies substantially parallel to said reference surface and one end of which extends beyond the base member and is adapted for engagement with said bracket, and means for adjusting the position of the hanging member relative to the base member so that said end is moveable in a plane substantially parallel to said reference surface, characterised in that the adjusting means comprises two adjusting devices of-two dimensional type which operate on the hanging member in a plane substantially parallel to said reference surface and operate to move said end in respective different directions.

The invention further provides a mounting device for mounting a panel to a bracket on a wall at a right angle to the wall, comprising a housing provided with means for engaging a major surface of said panel and a hanging member comprising an element having a longitudinal axis, said hanging member being adapted to be received in an aperture of said housing and being provided with means for releasably engaging said bracket, the mounting unit further comprising a first adjustor device for adjusting the position of the housing relative to the bracket substantially in the direction of said longitudinal axis and a second adjustor device for adjusting the position of the housing relative to the bracket in a direction substantially perpendicular to said longitudinal axis such that the panel may be raised or lowered to a desired position on said wall wherein, said first and second adjustor devices each comprise a spigot having a plurality of projections extending radially outwardly of the periphery thereof which are adapted to cooperably engage projections extending radially inwardly of respective apertures of said housing.

In order that the invention may be well understood, an embodiment thereof, which is given by way of example only, will now be described with reference to the accompanying drawings, in which:

FIG. 7 is a front elevational view of a second adjustor means of the mounting device;

FIG. 8 is a side view of the adjustor means of FIG. 7;

Figure 2:
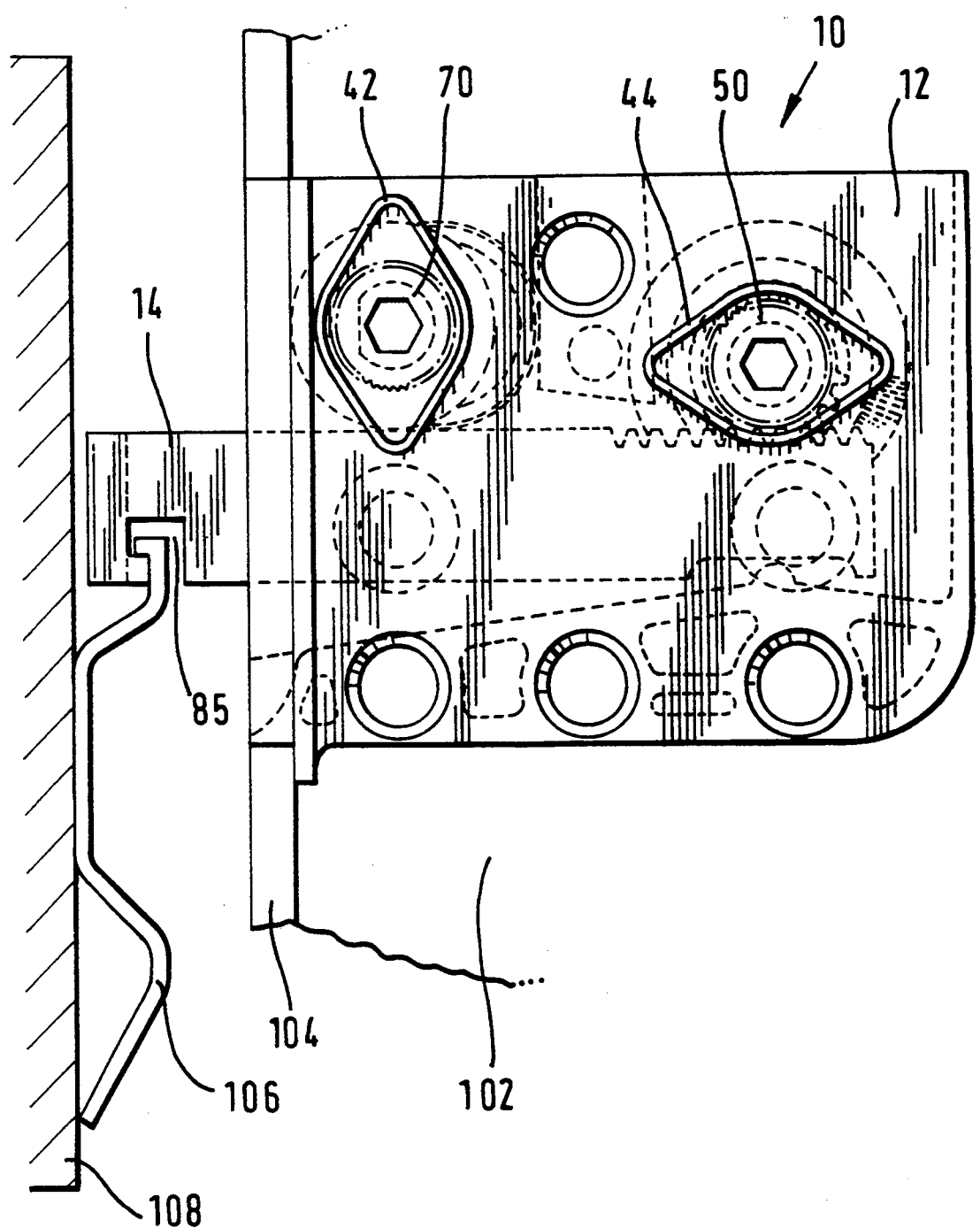
FIG. 2 is a side view of a mounting device according to the invention.
Figure 3:
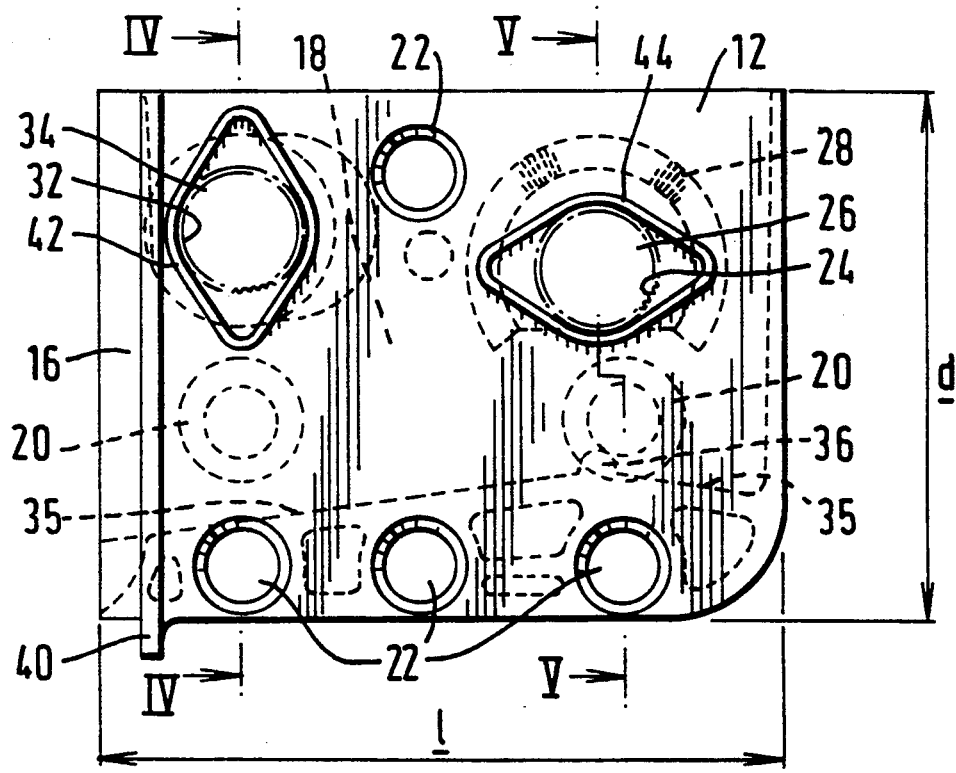
FIG. 3 is a side view of a housing of the mounting device.
Figure 4:
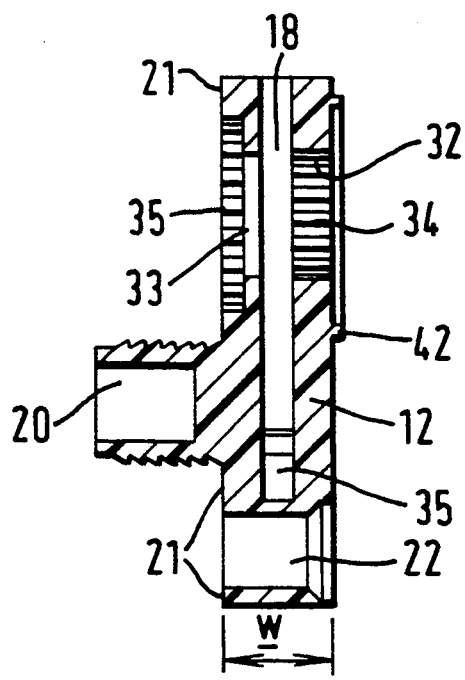
FIG. 4 is a sectional view of the housing on line IV—IV.
Figure 5:
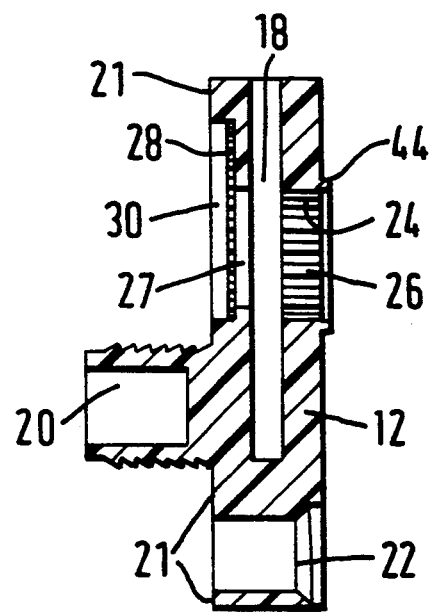
FIG. 5 is a sectional view of the housing on line V—V.
Figure 9:
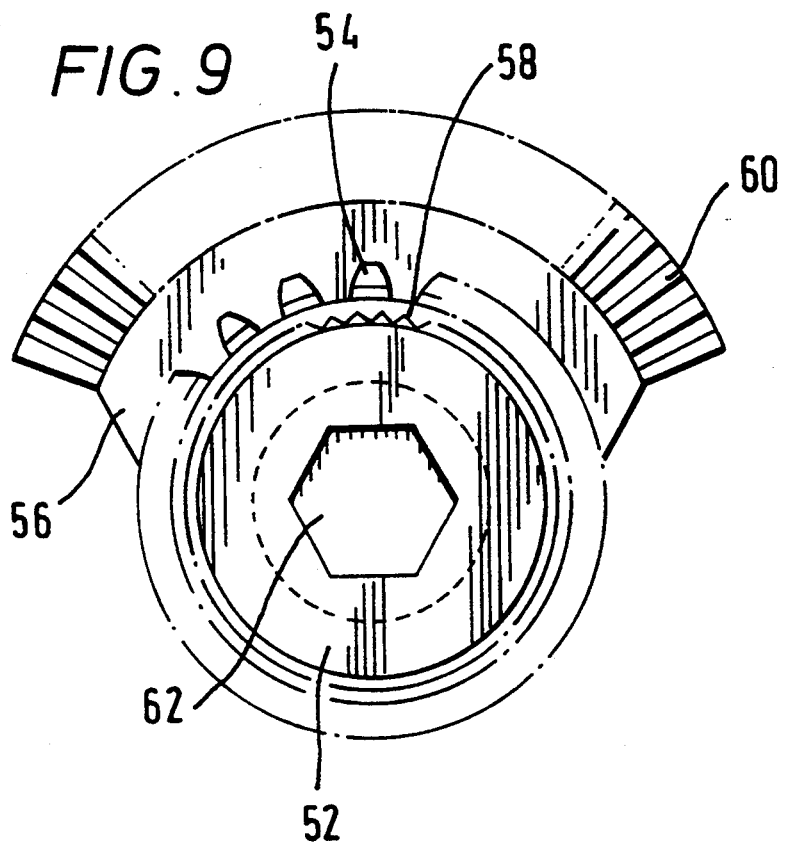
FIG. 9 is a front elevational view of a first adjustor means of the mounting device.
Figure 10:
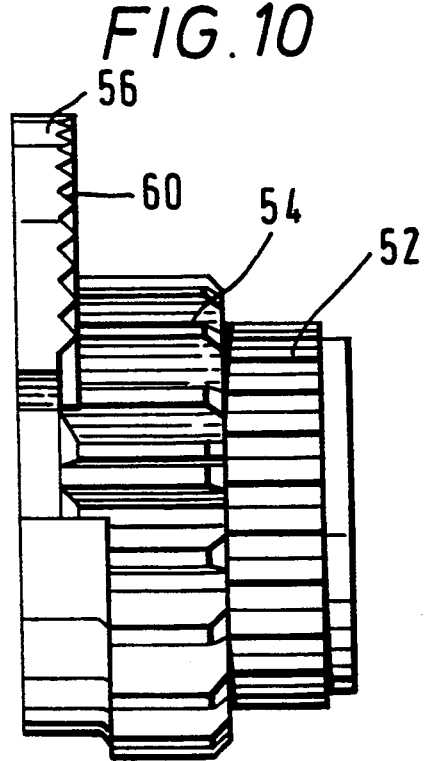
FIG. 10 is a side view of the adjustor means of FIG. 9.

Referring to FIG. 2 a mounting device 10 comprises a housing or base member 12 and a hanging member 14. The housing 12 (best seen in FIGS. 3 to 5) is preferably a unitary plastics moulding and has a width w which is substantially less than either its length l or depth d. A substantially rectangular aperture 16 adapted to receive the hanging members 14 is provided in an end face of the housing extending to a chamber 18 of the housing. It should be noted that the chamber 18 generally retains the same width as aperture 16 which is substantially that of the hanging member 14. The housing comprises means for engaging bores provided in a surface of a panel to which the device 10 is to be fitted. The engaging means are in the form of a pair of spaced apart pegs 20 extending perpendicularly of a side or reference surface 21 of the housing. Each peg 20 is provided with circumferentially extending formations or barbs for engaging the walls of its respective bore. Alternatively, throughbores 22 are provided in the housing whereby it may be secured to the panel by means of securing members such as screws or nails.

A flange 40 extends around the front and lower sides (as viewed in FIG. 3) of the housing 12 for purposes which will be described hereinafter.

It will be understood that the additional securement provided by the screws or nails is not essential to the functioning of the device and that the throughbores may therefore be omitted from the housing. Alternatively, the pegs 20 could be omitted, and securement be provided by means of securing members via throughbores 22. It is further to be understood that the reference surface 21 need not necessarily comprise a single and/or extensive surface area, but may comprise a series of discreet points each arranged such that it contacts the above-mentioned major surface when the pegs 20 engage their respective bores.

The housing 12 is further provided with respective means for receiving first and second adjustor devices 50, 70 of the device 10. Each receiving means comprises a series of aligned bores and recesses 26,27,30;33,34,35 extending through the housing transverse to chamber 18 and intersecting therewith such that the adjustor devices may interact with the hanging member 14 when it is inserted in the housing though aperture 16 and received in chamber The first adjustor device 50 and second adjustor device 70 will now be described with reference to FIGS. 6 to 9. The first adjustor device 50 comprises a spigot 52, a pinion 54 axially aligned therewith and a flange portion 56 extending radially outwardly of the spigot axis. The spigot 52 is provided with a plurality of projections extending radially outwardly thereof. The projections are in the form of teeth 58 having a generally triangular cross-section, which extend over the length of the spigot and are adapted to engage similar such teeth 24 which extend radially inwardly of an aperture 26 of the respective receiving means. The flange portion 56 is also provided with formations or teeth 60. The teeth are formed in the face of flange portion 56 adjacent the pinion 54 and are adapted to engage similar such teeth 28 formed in the base of recess 30 of the receiving means.

The adjustor device 50 is also provided with a tool engageable portion in the form of an hexagonal aperture 62 formed in the free end of spigot 52 for receiving an allen key, hexagonal wrench or other suitable drive means. It will of course be understood that aperture 62 may alternatively be formed to accept another form of tool such as a screwdriver.

The second adjustor device 70 comprises a spigot 72, flange portion 74 axially aligned therewith and an eccentric cam portion 76. In a similar manner to the spigot 52 of the first adjustor device 50, the spigot 72 is provided with teeth 78 for engaging similar such teeth 30 of an aperture 32 of the respective receiving means. Likewise an hexagonal aperture 79 is provided in the free end of the spigot 72 for receiving an allen key.

It will be appreciated, that the above-described adjustor devices 50, 70 are each of a two dimensional type which operate on the hanging member 14 in a plane substantially parallel to said reference surface. For the purpose of this specification the term "adjusting device of two dimensional type" means an adjusting device in which, for the purpose of achieving adjustment, movement occurs only in the plane of two axes of a three orthogonal axis coordinate system. In such devices, the total dimensions of the device along the third axis are dictated only by the need to give the components sufficient strength to operate, and not by the need to accommodate movement along that axis, so that such devices can be made of relatively small dimensions as measured along that axis.

Figure 6:
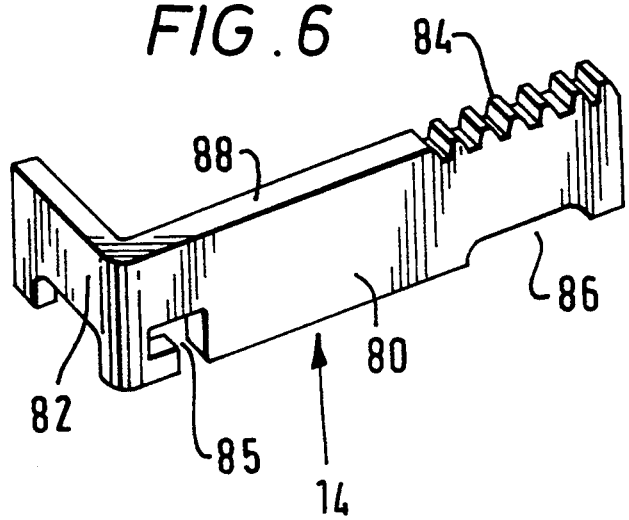
FIG. 6 is a view of a hanging member of the mounting device.

Referring to FIG. 6, the hanging member 14 comprises an element 80, having a longitudinal axis and adapted to be slidably received in aperture 16 and the chamber 18, and a perpendicularly extending limb 82. A rack 84 is provided on an upper (as viewed in FIG. 6) surface of element 80 for engaging the pinion 54 of the first adjustor device 50. A recess 86 is provided in a lower surface of the element generally opposite the rack 84 and is arranged such that it may receive a dome-like protrusion 36 which extends upwardly of a floor 35 of chamber 18; the arrangement being such that movement of the hanging member in the direction if its longitudinal axis is prevented when the protrusion 36 engages either end of the recess 86. The hanging element is further provided with a substantially L-shaped slot 85 formed in the element 80 which enables it to engage a rail or bracket secured to a wall.

The limb 82 allows the hanging member 14 to also engage an alternative wall fixture to the rail or bracket. The alterative fixture is in the general form of a hook having a threaded portion which is securely screwed into the wall and will be familiar to those skilled in the art.

Figure 11:
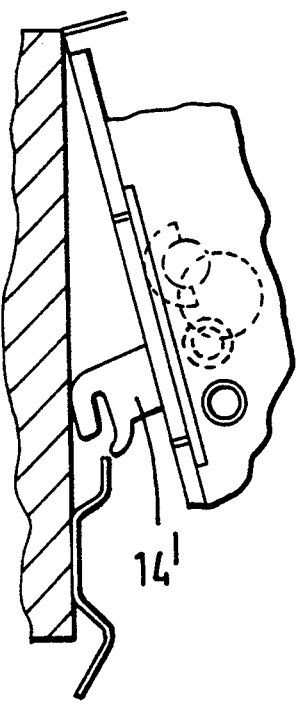
FIG. 11 is a view showing another form of the hanging member and illustrating a cabinet fitted with the device prior to engagement with a rail.

It is to be understood that the hanging member 14 shown in FIG. 6 is given by way of example only and that many configurations are possible. Another form of hanging member 14' is shown in FIG. 11 and comprises an element 80 having a protruding hook portion and a slot cooperating therewith for engaging a bracket of rail. However, such a hanging member would not be suitable for engaging the hook type wall fixture.

when the device is assembled with the hanging member 14 received in the aperture 16 and chamber 18 and the first and second adjustor means 50, 70 received in their respective receiving means 26,27,30; 33,34,35, the pinion 54 engages the rack 84 of the hanging member and cam face 75 of the eccentric cam 76 bears against a portion of the upper surface of element 80 generally denoted 88.

The operation of the mounting device in mounting a cabinet to a wall will now be described with reference to FIG. 2. It is to be understood that while the subsequent description refers only to a single mounting device, that in mounting such a cabinet a pair of mounting devices 10 would be used as described above in connection with the prior art device of FIGS. 1.

The device 10 is securely fixed to the inner major surface of a side panel 102 of the cabinet by means of the pegs 20 which firmly engage the walls of respective bores provided in the panel such that reference surface 21 firmly abuts that inner surface. As illustrated, the throughbores 22 have not been used. The device is positioned on panel 102 so as to be adjacent an upper rear corner of the cabinet. A cabinet back panel 104 is provided with an aperture through which a portion of the housing adjacent aperture 16 extends. The housing flange 40 is arranged so as to cover the edges of the back panel aperture so that a neat appearance is given when the device is fitted and no rough edges of the panel are visible. It can be seen that the hanging member 14 protrudes from the housing 12 and extends through the back panel aperture so as to be able to engage a rail 106 which is securely fixed to wall 108.

It is to be understood that while typically wall 108 would be an upright masonry structure of the type generally found in buildings, the term wall may be taken to refer to any suitable structure to which an article of furniture may be mounted. For example, the wall may comprise a timber frame covered by wooden panelling or plasterboard.

To mount the cabinet, it is raised to a height whereat the hanging member 14 is above the level of rail 106 (as shown in FIG. 11 with the alternative form 14' of the hanging member) and then lowered until the L-shaped slot 85 engages the rail as shown in FIG. 2. In this condition, the cabinet will hang with its weight supported by rail 106 via slot 85.

The cabinet can then be brought to a desired level by operating second adjustor device 70 using an allen key inserted in aperture 79. In this connection, it will be noted that the housing is provided with a protruding wall 42 having a general shape of a double-headed arrow which indicates the direction of adjustment provided by adjustor device 70. By rotating adjustor device 70 such that portions of cam 76 having the greatest eccentricity bear against surface 88 of the hanging member, the housing and thus side panel 102 can be driven upwards relative to rail 106 as the hanging member pivots about the general area of protrusion 36 in chamber 18. If adjustor device 70 is rotated to reduce the eccentricity of cam face 75 bearing against the hanging member, the housing will be lowered relative to the rail under its own weight. The teeth 78 of spigot 72 engaging the teeth 32 of aperture 34 have a high-interference contact inter-engagement therewith and serve to oppose rotation of the adjustor means and provide a locking action for retaining a particular setting or adjustment.

When the levelling operation is completed, the cabinet may be moved to the wall 108 such that rear facing surfaces thereof firmly engage the wall, by operating first adjustor device 50. In a similar fashion to that previously described in relation to adjustor device 70, a protruding wall 44 indicates the direction of adjustment provided. Rotation of adjustor device 50 is transformed via pinion 54 and rack 84 into a backwards or forward motion of the housing relative to rail 106 in the general direction of the longitudinal axis of the hanging member. Thus the cabinet may be driven to the wall to complete the mounting operation and subsequently driven away from the wall if the cabinet is to be demounted from the wall for any reason. The engagement of the respective sets of teeth 58, 60 of the adjustor device and 24, 28 of the receiving means, serve to prevent movement of the cabinet away from the wall when the mounting operation is complete by opposing rotation of the adjustor means.

It has been found that the teeth of the respective adjustor means bite deeply into the teeth of their respective receiving means when under load, thereby providing a high-interference contact inter-engagement and a very efficient locking action so that there is no tendency for the cabinet to shift from its mounted position even when the loading is relative high. It will be apparent that as the load is increased the locking action increases and will be maintained until a level is reached where material failure occurs. Using the preferred materials for constructing the device it has been found that failure only occurs under excessive loading.

The housing is preferably moulded in nylon 66, although many other plastics materials may also be suitable. The adjustor means are preferably die cast in Mazak or a zinc alloy but may alternatively be of other suitable casting metals or a plastics material suitable for injection moulding.

Although in the above-described embodiment, the adjustor devices comprise a cam and rack and pinion respectively, it is envisaged that other two dimensional type adjusting devices could be used. For example, a rotatable disc engaging a drive slot could be used for providing either of the adjusting movements required of the device.

In the figures, the teeth of the spigots are shown having a generally triangular cross-section. Alternatively, they may have the involute form of a gear tooth. In this case, the teeth of the respective apertures may also be in the involute form. In order to allow the adjustor means a limited freedom to rotate when a turning force is applied thereto by means of a suitable tool, the profile of the teeth of the apertures is reduced or relieved, such that the full involute form does not appear. Where this form of tooth is used, the spigot 52 and pinion 54 may have a common diameter and tooth profile.

The second adjustor device 70 is shown having a smooth flange portion 74. In an alternative form, a flange portion having teeth provided thereon in a manner similar to that of the first adjustor device 50 may be used. In this case, recess 35 is provided with teeth in the same way as recess 30 associated with the first adjustor device.

It will be appreciated that the mounting device 10 overcomes some of the problems associated with the prior art devices. For example, the device only comprises four components which are arranged in a manner which allows automated assembly thereof. The adjustor devices are such that the device 10 has a reduced width over the prior art device of FIGS. 1 and does not therefore protrude as greatly into the cabinet. Further the arrangement is such that adjustor device driven via the hexagonal apertures of the spigots is easily accessed and may be operated with relative ease, there being no problem with an operator's hand fouling the side panel or having to work from under the device.

Figure 1A:
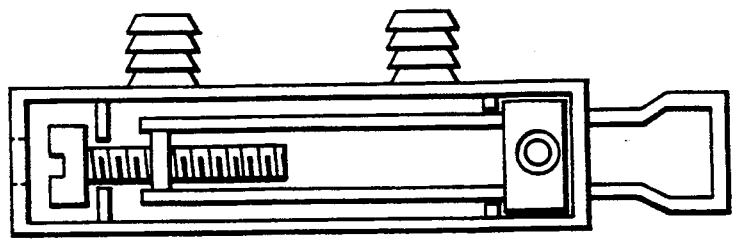
FIGS. 1a and 1b are representations of a prior art mounting device.
Figure 1B:
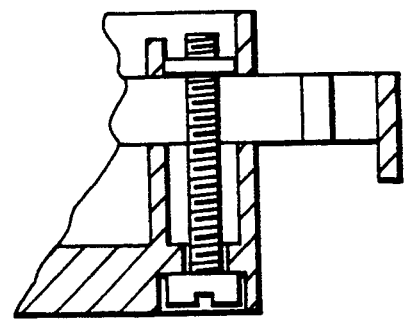

It will also be appreciated that the reduced width of the housing as compared with the prior art devices of FIG. 1, leads to a reduction in the twisting moment tending to pull the device away from a side panel to which it is secured and thus the tendency for either the pegs to shear or to tear out of the material surrounding the bores with which they engage.

It is to be understood that while reference has been made to use of the device for mounting cabinets or cupboards to a wall, the device is suitable for mounting any article of furniture having side panels which when mounted would be substantially perpendicular to the wall. Further the device may be used to mount a panel extending perpendicular to a wall to act as a room divider.

I claim:

1. A device for mounting a panel to a bracket on a wall with the panel vertical and at right angles to the wall, comprising a base member adapted to be secured with a reference surface thereof against a major surface of the panel and carrying a hanging member which lies substantially parallel to said reference surface and one end of which extends beyond the base member and is adapted for engagement with said bracket, and means for adjusting the position of the hanging member relative to the base member so that said end is moveable in a plane substantially parallel to said reference surface, characterised in that the adjusting means comprises two adjusting devices for moving said end in respective different directions and in that each adjusting device includes a single component which contacts the hanging member so as to be able to move said hanging member and which also is in high-interference inter-engagement with the base member to resist an inadvertent change of its adjusted position.

2. A device for mounting a panel to a bracket on a wall with the panel vertical and at right angles to the wall, comprising a base member adapted to be secured with a reference surface thereof against a major surface of the panel and carrying a hanging member which lies substantially parallel to said reference surface and one end of which extends beyond the base member and is adapted for engagement with said bracket, and means for adjusting the position of the hanging member relative to the base member so that said end is moveable in a plane substantially parallel to said reference surface, characterised in that the adjusting means comprises two adjusting devices of two dimensional type (as hereinbefore defined) which operate on the hanging member in a plane substantially parallel to said reference surface and operate to move said end in respective different directions.

3. A device as claimed in claim 2, wherein each adjusting device includes a single component which contacts the hanging member so as to be able to move said member, and which also is in high-interference inter-engagement with the base member to resist an inadvertent change of its adjusted position.

4. A device as claimed claim 1 or 2, wherein at least one of said adjusting devices is a rotatable cam.

5. A device as claimed in claim 1, wherein at least one of said adjusting devices is a rotatable pinion that engages with a rack.

6. A device as claimed in claim 1, wherein one adjusting device adjusts the amount of extension of the hanging member beyond the base member and is a rotatable pinion that engages with a rack and the other adjusting device adjusts the position of said end of the hanging member in a direction transverse to the first direction of adjustment and is a rotatable cam.

7. A device as claimed in claim 4, wherein the or each rotatable cam acts directly on the hanging member.

8. A device as claimed in claim 5, wherein the rack of the or each rack and pinion is formed on the hanging member.

9. A device as claimed in claim 1, wherein each adjusting device is adjustable via a tool-engageable portion thereof which is on the opposite side of the device from said reference surface.

10. A device as claimed in claim 1, wherein each adjusting device is assembled to the base member by insertion into an aperture on the same side of the device as said reference surface.

11. A device as claimed in claim 10, wherein each adjusting device is in high-interference inter-engagement with its said aperture whereby in use to resist an inadvertent change of its adjusted position.

12. A mounting device for mounting a panel to a bracket on a wall at a right angle to the wall, comprising a housing provided with means for engaging a major surface of said panel and a hanging member comprising an element having a longitudinal axis, said hanging member being adapted to be received in an aperture of said housing and being provided with means for releasably engaging said bracket, the mounting unit further comprising a first adjustor device for adjusting the position of the housing relative to the bracket substantially in the direction of said longitudinal axis and a second adjustor device for adjusting the position of the housing relative to the bracket in a direction substantially perpendicular to said longitudinal axis such that the panel may be raised or lowered to a desired position on said wall wherein, said first and second adjustor devices each comprise a spigot having a plurality of projections extending radially outwardly of the periphery thereof which are adapted to cooperably engage projections extending radially inwardly of respective apertures of said housing.

13. A mounting device as claimed in claim 12, wherein said first adjustor means further comprises a pinion axially aligned with said spigot for cooperably engaging a rack provided on said hanging member.

14. A mounting device as claimed in claim 13, wherein said first adjustor means further comprises a flange portion extending radially outwardly of said spigot axis and provided with a plurality of projections for engaging projections provided on said housing.

15. A mounting device as claimed in claim 12, wherein said second adjustor means further comprises an eccentric cam portion arranged to bear on a surface of said hanging member.

16. A mounting device as claimed in claim 12, wherein said second adjustor means further comprises a flange portion extending radially outwardly of the spigot axis and provided with a plurality of projections for engaging projections provided on said housing.

17. A mounting device as claimed in claim 12, wherein said means for engaging the panel comprise a plurality of spaced apart pegs, each peg being provided with at least one circumferentially extending formation for engaging the wall of a recess provided in said panel.

18. A mounting device as claimed in claim 12, wherein a chamber for receiving said hanging member is provided with a protrusion arranged to protrude into a longitudinally extending recess of the hanging member, the arrangement being such that movement of the hanging member in the direction of said longitudinal axis is prevented when said projection engages either end of the recess.

19. A mounting device as claimed in claim 12, wherein said hanging member further comprises a limb extending perpendicularly of said element; said limb together with a substantially L-shaped slot provided in the element adjacent said limb constituting said means for engaging the bracket.

20. A mounting device as claimed in claim 12, wherein said housing is provided with at least one throughbore arranged such that the housing may be secured to said major surface of the panel by a securing member.

21. A mounting device as claimed in claim 12, wherein said housing is in the form of a substantially rectangular box having a width not greater than a quarter of either the length or breadth thereof.

22. A mounting device as claimed in claim 12, wherein said projections of said spigot are gear teeth having an involute form.

* * * * *